US008216074B2

(12) United States Patent
Sakuma

(10) Patent No.: US 8,216,074 B2
(45) Date of Patent: Jul. 10, 2012

(54) GAMING MACHINE

(75) Inventor: Hiro Sakuma, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 1151 days.

(21) Appl. No.: 12/020,872

(22) Filed: Jan. 28, 2008

(65) Prior Publication Data

US 2008/0268962 A1 Oct. 30, 2008

(30) Foreign Application Priority Data

Jan. 30, 2007 (JP) ................................ 2007-020003

(51) Int. Cl.
*A63F 9/24* (2006.01)
*A63F 13/00* (2006.01)

(52) U.S. Cl. ...... 463/46; 463/47; 312/223.1; 312/223.2; 312/350; 312/351.1

(58) Field of Classification Search .............. 463/46–47; 312/223.1, 223.2, 350, 351.1
See application file for complete search history.

(56) References Cited

U.S. PATENT DOCUMENTS 4,440,457 A * 4/1984 Fogelman et al. .............. 463/46
6,093,102 A 7/2000 Bennett
6,422,670 B1 * 7/2002 Hedrick et al. ............ 312/223.1
6,702,409 B2 * 3/2004 Hedrick et al. ............ 312/223.1
6,886,896 B2 * 5/2005 Hedrick et al. ............ 312/223.1
6,997,810 B2 * 2/2006 Cole .............................. 463/46
7,217,191 B2 * 5/2007 Cordell ........................... 463/37
7,267,613 B2 * 9/2007 Cole .............................. 463/20
7,513,830 B2 * 4/2009 Hajder et al. .................. 463/46
7,601,067 B2 * 10/2009 Anderson ....................... 463/46
7,686,694 B2 * 3/2010 Cole .............................. 463/46
2002/0041133 A1 4/2002 Hedrick et al.
2004/0018877 A1 * 1/2004 Tastad et al. .................... 463/46
2004/0061284 A1 * 4/2004 Satoh ......................... 273/138.1

FOREIGN PATENT DOCUMENTS

EP 1 437 698 A 7/2004
GB 2 388 696 A 11/2003
JP 2004-298227 10/2004

* cited by examiner

*Primary Examiner* — Steven J Hylinski
(74) *Attorney, Agent, or Firm* — Arent Fox LLP

(57) ABSTRACT

A gaming machine is provided, which includes a housing with an opening in front thereof and a front door that is pivotally coupled to one side of the housing so as to open and close the opening. The front door includes a display, a decorative device, and an operation device. The display device is disposed in an upper portion of the housing. The decorative device is disposed in a lower portion of the housing. The operation device is disposed in a middle portion of the housing. A front portion of the operation device projects with respect to the display device and the decorative device. A rear portion of the operation device is internally installed in the front door. The operation device is configured to move backward such that a front surface of the front door is maintained substantially flush while the front door is opened.

6 Claims, 5 Drawing Sheets

GAMING MACHINE

This application is based on and claims the benefit of priority from Japanese Patent Application No. 2007-020003, filed on 30 Jan. 2007, the content of which is incorporated herein by reference.

BACKGROUND OF THE INVENTION

1. Field of the Invention

The present invention relates to a gaming machine. Particularly, the present invention relates to a configuration of a gaming machine provided with a housing including an opening on the front face and a front door that covers the opening.

2. Related Art

Generally, a slot machine, which is kind of a gaming machine, is provided with a housing including an opening on the front face and a front door, which can be freely opened and closed. A reel unit that variably displays a plurality of symbols is provided on the top part of the inside of the housing, for example. Furthermore, a hopper, which can store and discharge medals as a game medium, and a power supply box are disposed at the bottom part of the inside of the housing. The front door is at least provided with a display window through which the plurality of symbols can be observed. The hopper can be replenished with medals by opening the front door. Furthermore, inside of the housing and inside of the front door can be inspected or maintained by opening the front door.

For example, a slot machine is developed, which has the following features: It is possible to maintain the gaming machine in good condition in regards to preventing fraudulent acts by wrongdoers while the front door is opened. In addition, the slot machine includes a front door that can be easily opened and closed, allowing staff to replenish medals easily and smoothly in the hall where slot machines are disposed in juxtaposition to each other. (ex., see Japanese Patent Laid-Open Publication No. 2004-298227).

The gaming machine according to Patent Document 1 is provided with a front door that covers the front face in a manner in which the front door can be easily opened and closed. In an upper portion and a lower portion of the gaming machine, the front door is separated into an upper door and a lower door. The lower door can be opened and closed independently from the upper door. The upper door is pivotally coupled to the housing and covers the reel unit stored inside the housing. The lower door can be slid forward and backward, and covers a hopper and a power supply box. The gaming machine is configured so that when the lower door is pulled forwardly out, the hopper and the spare tank, which is an attachment of the hopper, come out to the front side of the housing with the lower door.

Generally, a front door of a slot machine is provided with the display portion including the display window formed substantially flat. The display portion is disposed in an upper portion of the front door. The display portion is not projecting frontward significantly. On the other hand, the operation portion, which includes a start lever and the like to start a plurality of reels, is disposed below the display portion and projects from the front door in a trapezoidal-body shape. The operation part projects frontward farther than the display portion.

The front door of the slot machine is integrally configured with the display portion and the operation portion. Furthermore, the one side of the front door is coupled to a housing with a hinge or the like. When the front door is rotated open, the projecting operation portion strikes a slot machine disposed adjacent, whereby the front door cannot be opened sufficiently, and a case may occur in which replenishment of medals or maintenance is not easy to handle. As disclosed in Patent Document 1, the front door is separated into the upper door and the lower door. The upper door, which is provided with a display portion, is configured to be rotatable, and the lower door, which is provided with the operation portion, is configured to be slidably moved back and forward. With such a configuration, the case described above can be prevented.

However, the front door of the slot machine according to Patent Document 1 is configured so that the lower door is opened by pulling out forwardly. The lower door projecting forwardly is disposed at a position corresponding to a lumbar part or abdominal part of the human body. Therefore, a worker needs to bend his/her body to inspect or maintain the inside of the housing, or the inside of the front door and this configuration causes inconvenience. With the configuration in which the projecting operation portion can be moved backward, the front door can be opened sufficiently. Furthermore, it becomes convenient for the worker to inspect or maintain the inside of the housing while the front door is opened.

In addition, the slot machine according to Patent Document 1 is configured so that the lower door is moved in conjunction with the hopper. The hopper fully filled with medals becomes substantially heavy, and so pulling out the lower door becomes difficult. Furthermore, it is not preferable since a substantial inertial force, which impacts the housing, is generated when pushing in the lower door to the housing. The hopper is preferably secured to the inside of the housing. Therefore, the foregoing is a problem to be solved by the present invention.

SUMMARY OF THE INVENTION

The inventor has come to invent a gaming machine described below that is equipped with a novel front door. The invention utilizes the front door that has a substantially flush front while it is opened so as to avoid interference with adjacent gaming machines. Such a feature is realized by a slide device that slides an operation portion backward with respect to the front door and a lock mechanism that can maintain the operation portion to be in a backwardly moved position and a forwardly restored position.

In an aspect of the present invention, a gaming machine is provided, which includes a housing with an opening in front thereof and a front door that is pivotally coupled to one side of the housing so as to open and close the opening. The front door includes a display device, a decorative device, and an operation device. The display device is substantially flat and disposed in an upper portion of the housing. The decorative device is disposed in a lower portion of the housing. The operation device is substantially flat and disposed in a middle portion of the housing. A front portion of the operation device projects with respect to the display device and the decorative device. A rear portion of the operation device is internally installed in the front door. The operation device is configured to move backward such that a front surface of the front door is maintained substantially flush while the front door is opened.

In another aspect of the present invention, a gaming machine is provided, which includes a housing with an opening in front thereof and a front door pivotally coupled to one side of the housing so as to open and close the opening. The front door includes a display device, a decorative device, and an operative device. The display device is substantially flat and disposed in an upper portion of the housing. The decorative device is substantially flat and disposed in a lower portion of the housing. And an operation device is disposed in a middle portion of the housing, and a front portion of the operation device projects with respect to the display device and the decorative device. A rear portion of the operation device is internally installed in the front door. In addition, the operation device includes a support device, a pair of slide devices, a protrusion device, a biasing device, and a lock device. The support device with a concave cross section encloses a rear portion of the operation device. Both distal portions of the support device are fixed to the front door. The pair of slide devices slidably couples the both distal portions of the support device to both walls of the operation device so as to allow the operation device to move in forward and backward directions with respect to the front door. A first distal portion of the protrusion device is fixed to a rear wall of the operation device, and a second distal portion of the protrusion device projects from a surface of the support device that is spaced a predetermined distance from the rear wall. The biasing device, which is attached to the protrusion device, allows the operation device to move in a forward direction. The lock device allows the operation device to be maintained selectively in a backwardly moved position and a forwardly restored position. The operation device is configured to move backward such that a front surface of the front door is maintained substantially flush while the front door is opened.

In still another aspect of the present invention, a gaming machine is provided, which includes a housing with an opening in front thereof and a front door pivotally coupled to one side of the housing so as to open and close the opening. In addition, the front door includes a display portion, a decorative panel, and an operation portion. The display portion is substantially flat and disposed in an upper portion of the housing. The decorative panel is substantially flat and disposed in a lower portion of the housing. The operation portion is disposed in a middle portion of the housing, and a front portion of the operation portion projects with respect to the display portion and the decorative panel. A rear portion of the operation portion is internally installed in the front door. In addition, the operation portion includes a support member, a pair of slide members, a rod member, a biasing member, and a lock mechanism. The support member has a concave cross section that encloses a rear portion of the operation portion. Both distal portions of the support member are fixed to the front door. The pair of slide members slidably couples the both distal portions of the support member to both walls of the operation portion so as to allow the operation portion to move in forward and backward directions with respect to the front door. A first distal portion of the rod member is fixed to a rear wall of the operation portion, and a second distal portion of the rod member projects from a surface of the support member that is spaced a predetermined distance from the rear wall. The biasing member allows the operation portion to move in a forward direction and is attached to the rod member. The lock mechanism allows the operation portion to be maintained selectively in a backwardly moved position and a forwardly restored position. The operation portion is configured to move backward such that a front surface of the front door is maintained substantially flush while the front door is opened.

The housing is, for example, configured to be a hollow box of a rectangular parallelepiped and to have a substantially rectangular opening in front. It is possible to open the front door to perform inspection and maintenance inside the housing. It is possible to close the front door to cover the opening of the housing. It should be noted that covering the opening of the housing includes screening the inside of the housing except for the display window from view and preventing electrical and physical access to the inside of the housing.

It may be possible to adopt a hinge, for example, for pivotally coupling the front door to one side of the housing. The hinge may include a hinge that allows the front door and the housing to be attached and detached each other as well as a hinge that can maintain the front door selectively in open and close positions.

The operation portion in a box-like shape projecting from the front door may include a substantially horizontal base portion. It may be possible to place an insertion opening and three bet switches on the base portion. A conventional operation portion, which is secured to a front door and projects with respect to a display portion and an decorative portion, tends to abut to adjacent gaming machines while the front door is opened at a right angle.

The slide rail may include a guide rail that provides slidable coupling and a slider. It may be possible to secure a pair of guide rails to the both sides of the support member, and a pair of sliders to the both sides of the operation portion. Alternatively, it may be possible to adopt a slidable coupling including a shaft and a linear motion bearing. In this case, it may be possible to secure a pair of shafts to the both sides of the support member, and a pair of linear motion bearings to the both sides of the operation portion.

In yet another aspect of the present invention, a gaming machine is provided, in which the lock mechanism includes a guide member and a guide rod. The guide member is disposed on an upper wall of the operation portion and has a heart cam groove. A first distal portion of the guide rod is coupled to the heart cam groove and a second distal portion thereof is engaged with the support member. When the operation portion is positioned to project from the front door, the first distal portion of the guide rod is configured to lie at an initial position of the heart cam groove. When the operation portion is moved backward against the biasing member, the first distal portion of the guide rod moves in an orbit for an outward stroke of the heart cam groove and engages with a V-shaped groove formed at a top of the heart cam groove so as to allow the operation portion to be maintained in the backwardly moved position.

In a further aspect of the present invention, a gaming machine is provided, in which the lock mechanism includes a guide member that is disposed on an upper wall of the operation portion and has a heart cam groove. A first distal portion of the guide rod is coupled to the heart cam groove, and a second distal portion thereof is engaged with the support member. The first distal portion of the guide rod engages with a V-shaped groove formed at a top of the heart cam groove so as to allow the operation portion to be maintained in the backwardly moved position. When the operation portion is further depressed backward with respect to the backwardly moved position, the first distal portion of the guide rod is released from the V-shaped groove to move into an orbit for a return stroke of the heart cam, returning to an initial position of the heart cam due to force applied to the operation portion by the biasing member so as to allow the operation portion to be maintained in the forwardly restored position.

In a still further aspect of the present invention, a gaming machine is provided, in which the housing has a stop member to which the second distal portion of the rod member abuts, and the stop member restricts the operation portion from moving backward while the front door is closed.

The stop member may be an angle member to which the other distal portion of the rod member abuts and that is attached to a rack portioning the inside of housing into upper and lower portions. The angle member restricts the operation portion from moving in a backward direction while the front door is closed.

The gaming machine described above allows the operation portion to move backward only while the front door is open. The gaming machine according to the present invention, in which the front door has a substantially flush front surface, allows the front door to be opened at a larger angle. This enables better access to the inside of the housing for inspection and maintenance.

DETAILED DESCRIPTION OF THE INVENTION

Embodiments of the present invention are hereinafter described in detail with reference to the attached drawings.

Figure 1:
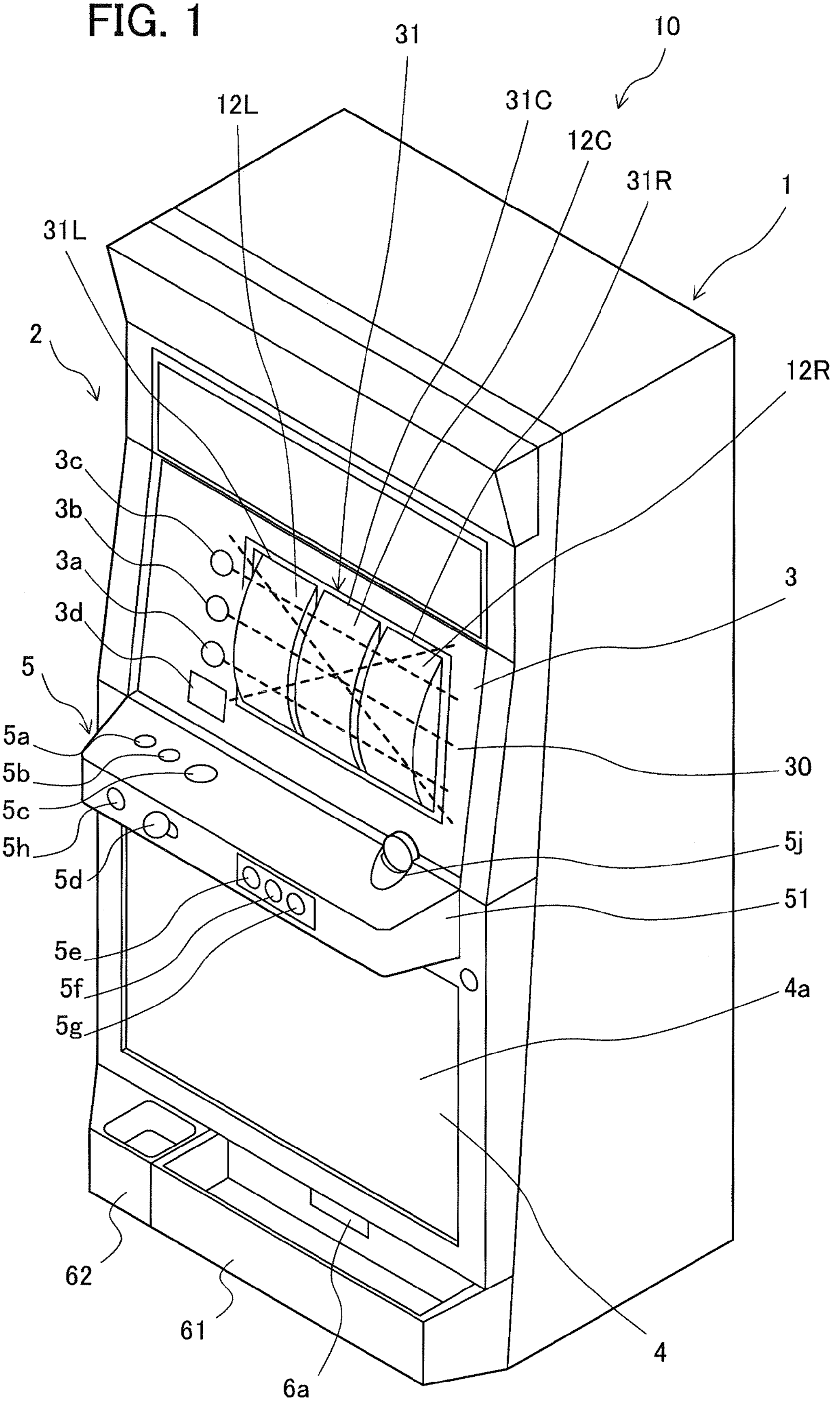
FIG. 1 is an external perspective diagram showing the configuration of a gaming machine according to an embodiment of the present invention.
Figure 2:
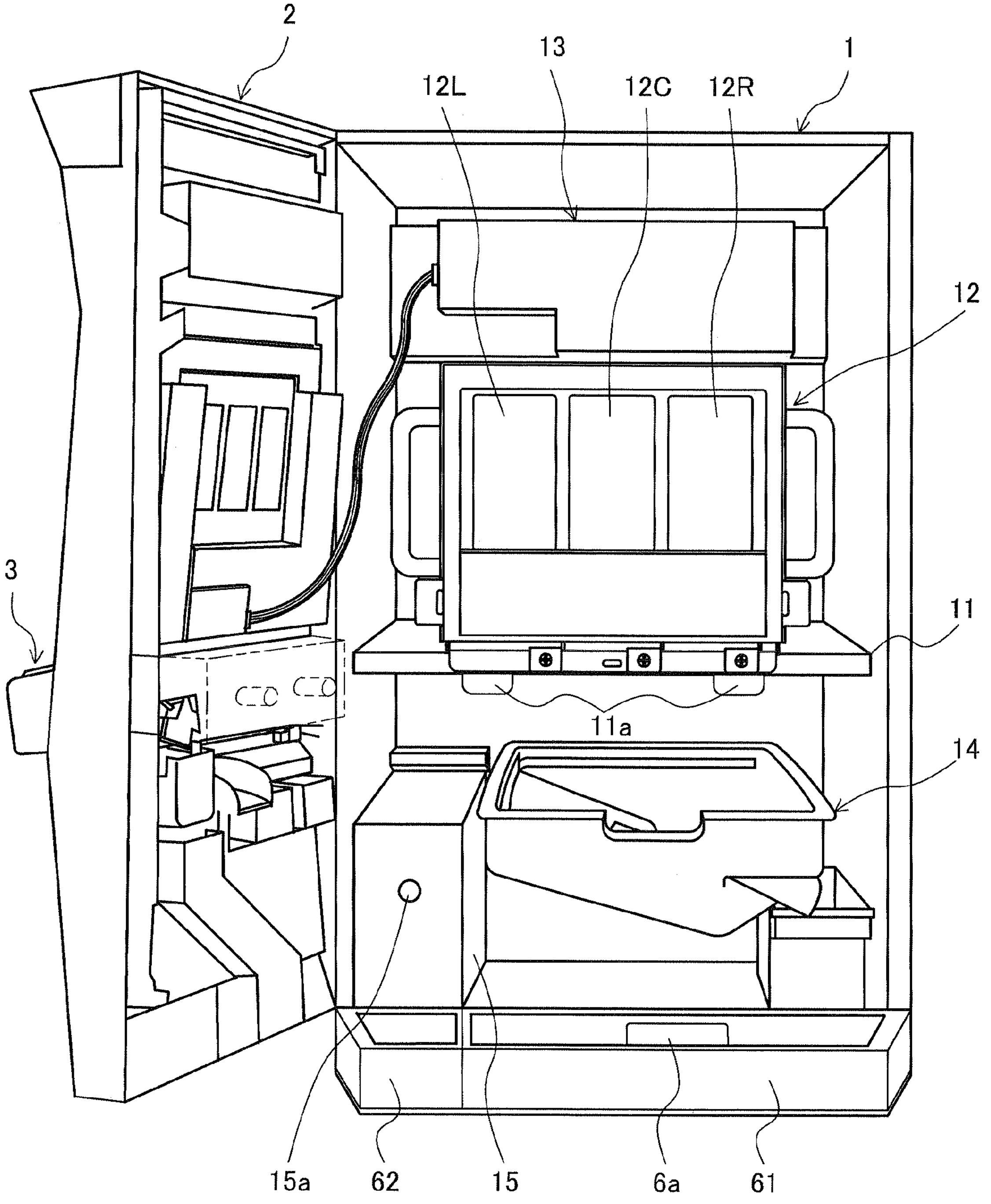
FIG. 2 is a front elevation view of the gaming machine with its front door opened.

The configuration of the gaming machine according to the present invention is first described. In FIGS. 1 and 2, a gaming machine 10 is a so-called "slot machine" or "pachinko-slot machine". The gaming machine 10 provides a game to a player through the use of a game medium, which is scrip money called a coin, medal, token, or the like. The following description is provided on the assumption that medals are used as the game medium. In addition, although the gaming machine 10 is a "slot machine" or a "pachinko-slot machine" in the embodiment, it may also be applied to other types of gaming machines.

In FIGS. 1 and 2, the gaming machine 10 is provided with a housing 1 and a front door 2. The housing 1 is provided with an opening on the front face. The front door 2 is pivotally coupled to one side of the housing 1 so as to open and close the opening of the housing 1. The front door 2 is provided with a display portion 3 (a display means), a decorative panel part 4 (means for decorating), and an operation portion 5 (an operation means). The display portion 3 is disposed on the upper portion of the front door 2, in which the display portion 3 is substantially flat. The decorative panel part 4 is disposed on the lower portion of the front door 2, in which the decorative panel part 4 is substantially flat. The operation portion 5 is disposed at the center part of the front door 2, in which the operation portion 5 is box-shaped (see FIG. 4). Furthermore, the front part of the operation portion 5 projects from the display portion 3 and the decorative panel part 4, and the rear part is internally-mounted within the front door 2 (see FIG. 4).

Figure 4:
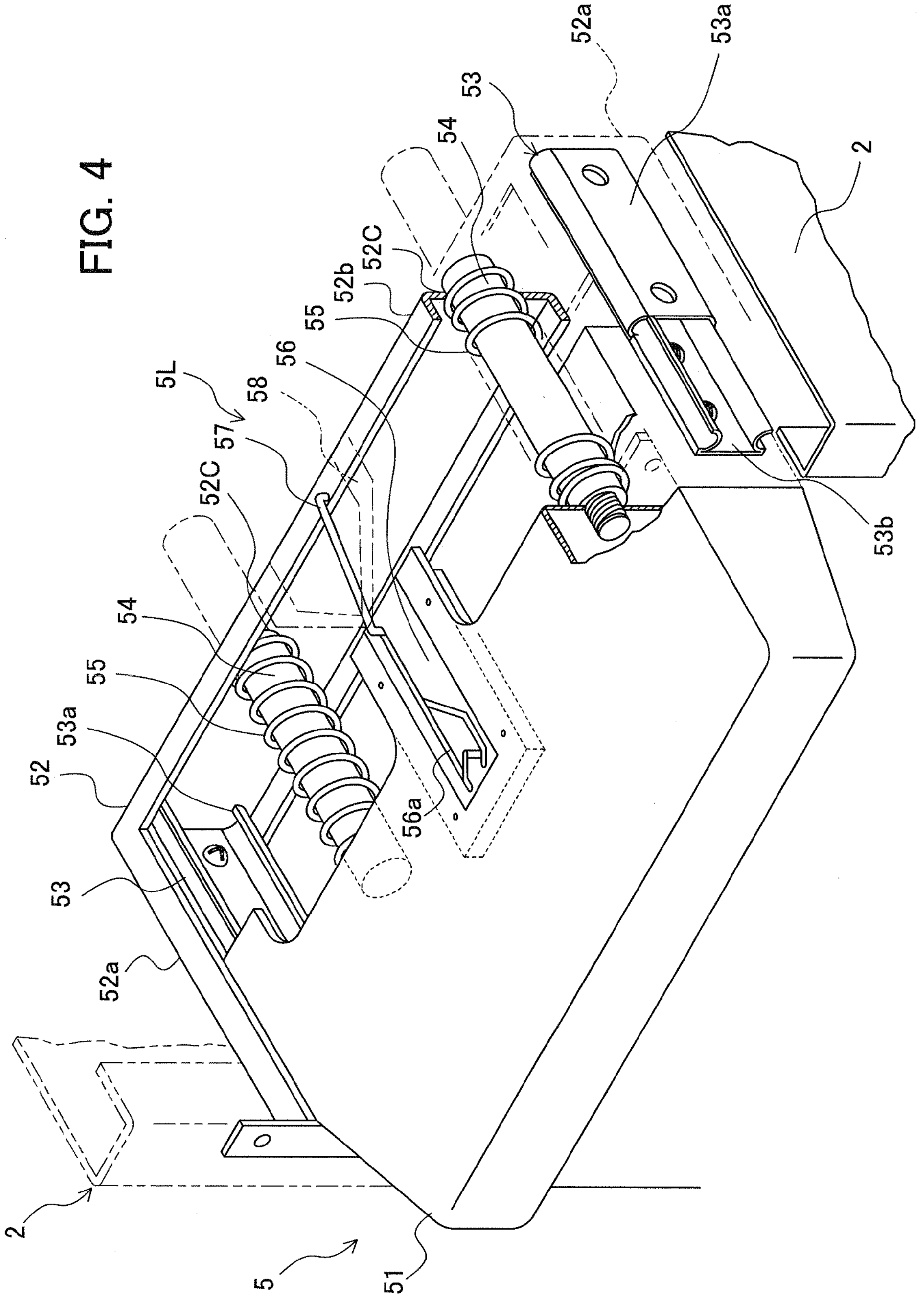
FIG. 4 is an external perspective diagram showing an operation portion of the gaming machine.

In FIG. 4, the operation portion 5 includes a box-shaped main body 51 and a concave support 52. Furthermore, the operation portion 5 includes a pair of slide members 53, a pair of rod members 54, a pair of helical compression springs 55 serving as biasing members, and a lock mechanism 5L.

In FIG. 4, both ends of the support 52 are secured to a frame of the front door 2, and the frame surrounds the rear part of the main body 51 of the operation portion 5. A pair of slide members 53 is slidably coupled to both ends 52*a* of the support 52, and both walls of the main body 5. The pair of the slide members 53 permits the main body 5 to move back and forth against the front door 2.

In FIG. 4, one end of the rod member 54 is secured to the rear wall of the main body 51. Furthermore, the other end of the rod member 54 projects from the opposite side 52*b* of the support 52 which is spaced a predetermined distance from the rear wall of the main body 51. A helical compression spring 55 is disposed about the rod member 54 and applies force to bias the main body 51 to move forward. The lock mechanism 5L can hold the main body 51 selectively in a backwardly moved position and a forwardly restored position.

In FIGS. 1 and 2, the housing 1 is formed in the box-shaped rectangular solid. The housing 1 is provided with a substantially rectangular opening on the front face having a cavity inside. The housing 1 can be inspected and maintained while opening the front door 2. The opening of the housing 1 can be covered when the front door 2 is closed. The front door 2 is pivotally coupled to one side of the housing 1 by a hinge (not shown).

In FIG. 2, a rack 11 is provided inside the housing 1 to divide the inner space into an upper room and a lower room. A reel unit 12 with symbols arranged circumferentially is set on the rack 11. Above the rack 11, a control panel 13 that includes a main board (printed circuit board) for controlling the gaming machine 10 and a sub-board (printed circuit board) is disposed. Furthermore, the rack 11 is provided with a pair of stop members 11*a* that comes into contact with the other end of the pair of the rod members 54 described below.

In FIG. 2, a hopper 14 is disposed at the bottom of the housing 1. The hopper 14 can store and discharge medals. A power supply box 15 is disposed adjacent to the hopper 14 at the bottom of the housing 1. The power supply box 15 includes a payout rate setting switch 15*a* disposed at the front face. The hopper 14 and the power supply box 15 are secured to the bottom part of the housing 1.

In FIG. 1, a display panel 30 formed in a display portion 3 is provided with a rectangular display window 31. The display window 31 is divided into individual display windows 31L, 31C, and 31R. Three reels 12L, 12C, and 12R with a plurality of symbols depicted on each outer circumferential surface are rotatably disposed on the reel unit 12 (see FIG. 2). Each of the reels 12L, 12C, and 12R is arranged to be observable through the display window 31.

In FIG. 1, three horizontal pay lines (at the center, above, and below) and two obliquely crossed pay lines are provided on the display window 31. The predetermined pay lines are activated (active pay lines) according to the amount of medals inserted prior to starting a game. According to the symbol combination achieved on the active pay line, whether or not to provide an award is determined.

In FIG. 1, a 1-BET lamp 3*a*, a 2-BET lamp 3*b*, a max-BET lamp 3*c*, and an information display portion 3*d* are provided on the left side of the display window 31. The 1-BET lamp 3*a*, the 2-BET lamp 3*b*, and the max-BET lamp 3*c* are activated according to the amount of medals bet for one game (hereinafter referred to as "bet number").

Here, in this embodiment, one game is terminated when all of the reels have come to rest. The 1-BET lamp 3*a* is activated when the bet amount is "1" and one pay line is activated. The 2-BET lamp 3*b* is activated when the bet amount is "2" and three pay lines are activated. The max-BET lamp 3*c* is activated when the bet amount is "3" and all of the pay lines (5 lines) are activated. The information display portion 3*d* is configured by a 7-segment LED, and displays the amount of stored (credited) medals, amount of medals to be paid out upon winning, and so on.

In FIG. 1, the decorative panel 4*a* for displaying the model name and the like is disposed on the decorative panel part 4. The illumination apparatus (not shown), which includes, for example, a fluorescent tube for illuminating the decorative panel 4*a* from the back, is also provided to the decorative panel part 4.

Figure 3:
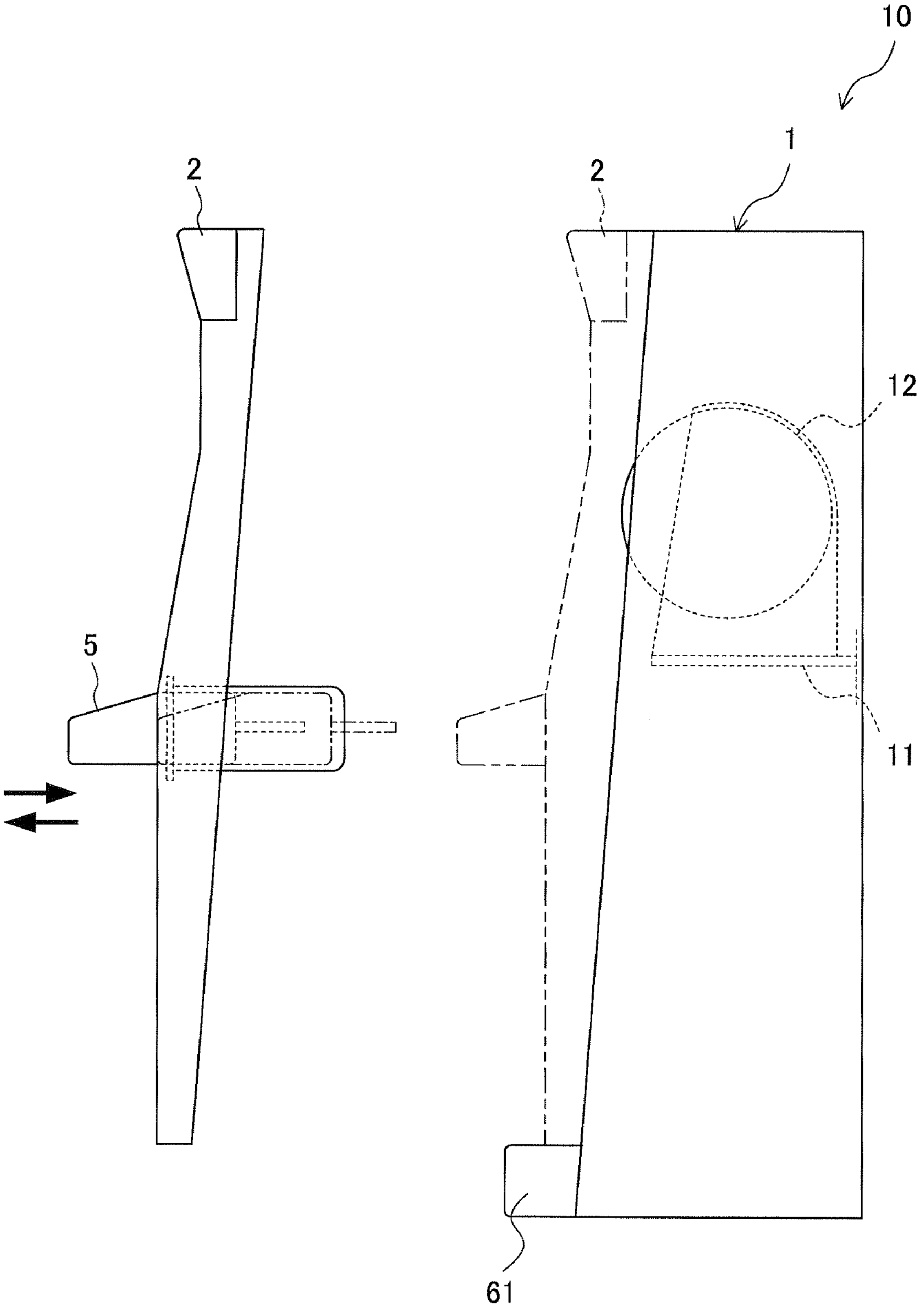
FIG. 3 is a side elevation view of the gaming machine with the front door thereof opened.

In FIG. 1, a medal receiving tray 61 and an ash tray 62 are disposed below the decorative panel 4. The ash tray 62 is disposed adjacent to the medal receiving tray 61. The medal receiving tray 61 and the ash tray 62, which are considerably project from the decorative panel 4, are secured to the housing 1 without being secured to the front door 2 that opens and closes (see FIG. 2 or FIG. 3). The medal receiving tray 61 can store medals discharged from a medal payout opening 6*a*.

In FIG. 1, three BET switches 5*a*, 5*b*, and 5*c* for push-button operation are disposed on the top face of the main body 51 of the operation portion 5. The BET switch 5*a* is used for betting one game medal on one game. The BET switch 5*b* is used for betting two game medals on one game. The BET switch 5*c* is used for betting three game medals on one game.

In FIG. 1, a start lever 5*d* is tiltably provided on the left side of the front face of the main body 51. When the start lever 5*d* is tilted by a player, the three reels 12L, 12C, and 12R start to rotate simultaneously. When the three reels 12L, 12C, and 12R rotate, a plurality of symbols depicted on each outer circumferential surface is variably displayed on the display window 31.

In FIG. 1, three reel stop buttons 5*e*, 5*f*, and 5*g* are provided at the center of the front face of the main body 51. The reel stop button 5*e* corresponds to the reel 12L, the reel stop button 5*f* corresponds to the reel 12C, and the reel stop button 5*g* corresponds to the reel 12R. When a player pushes the reel stop button 5*e*, the reel 12L stops, when the player pushes the reel stop button 5*f*, the reel 12C stops, and when the player pushes the reel stop button 5*g*, the reel 12R stops.

Figure 5:
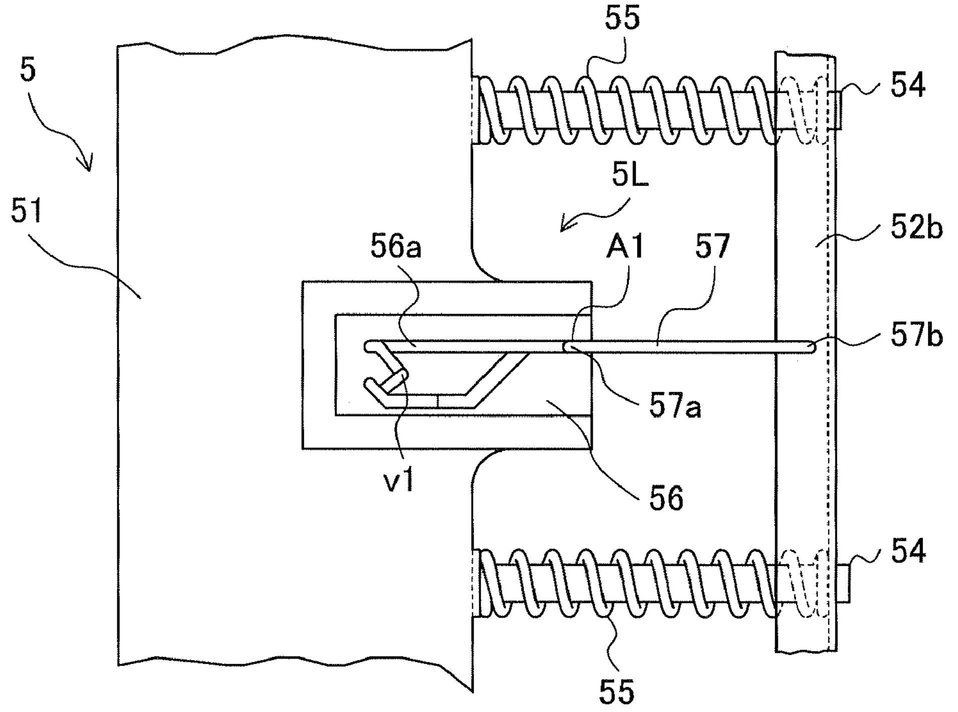
FIG. 5 is a top view showing the operation portion of the gaming machine while the operation portion projects from the front door.
Figure 6:
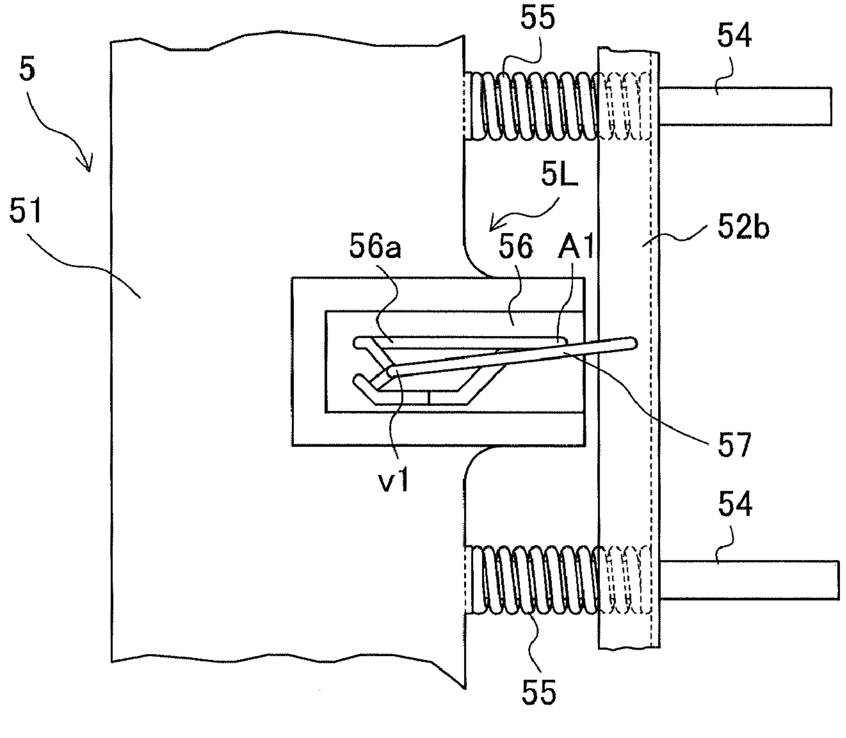
FIG. 6 is a top view showing the operation portion of the gaming machine that while the operation portion is moved backward against the front door.

In FIG. 1, a payout button 5*h* is provided on the left side of the start lever 5*d*. When a player pushes the payout button 5*h*, the medals inserted are paid out from the medal payout opening 6*a* and the medals paid out are stored in the medal receiving tray 61. An insertion opening 5*j* for the player to insert medals is disposed to the right side of the top face of the main body 51. In FIGS. 4 to 6, this switch group and the insertion opening 5*j* are not shown.

In FIG. 4, the support 52 is formed in a concave shape by folding an extended metal plate. Both ends of the support 52 are secured to the front door 2, being secured from inside of the front door 2 with a joining means such as a screw (not shown). The pair of slide members 53 is disposed between both sides of the main body 51. The opposite side 52*b* is spaced the predetermined distance from a rear wall of the main body 51, and the support 52 covers a rear part of the main body 51.

In FIG. 4, a commercially available slide rail can be used for the slide member 53. The slide rail is configured with a guide rail 53*a* and a slider 53*b* slidably coupled to each other. A pair of guide rails 53*a* is secured to both sides of the support 52. A pair of sliders 53*b* is secured to both sides of the main body 51. The pair of slide rails 53*a* permits the movement back and forth against the front door 2.

In FIG. 4, one rod member 54 may be disposed at the rear wall of the main body 51, and in this embodiment, rod members 54 are disposed separately at the rear wall of the main body 51 in a pair. One end of the rod member 54 may be provided with male threads by which the rod member 54 is secured to the rear wall of the main body 51 with a nut (not shown). In this way, the main body 51 of the operation portion 5 and the pair of rod members 54 are mechanically integrated. A hole 52*c* that fits to the rod member 54 is provided to the opposite side 52*b* of the support 52, and the other end of the rod member 54 project from the hole 52*c*.

In FIG. 4, a helical compression spring 55 is disposed to the rod member 54. A configuration in which one end of the helical compression spring 55 comes into contact with the rear wall of the main body 51, and the other end of the helical compression spring 55 comes into contact with the opposite side 52*b* of the rod member 52, thereby applying force to bias the main body 51 to move forward. The main body 51 can be moved backward by pushing the main body 51 against the helical compression spring 55 (see FIG. 6). When the main body 51 is released, the helical compression spring 55 moves the main body 51 back to the initial position (see FIG. 5).

In FIGS. 4 to 6, the locking mechanism 5L is provided with a guide member 56 and a guide rod 57. The guide member 56 is provided to the top wall of the main body 51 and a heart shaped cam groove 56*a* is formed. One end 57*a* of the guide rod 57 is coupled to the heart shaped cam groove 56*a*. The other end 57*b* of the guide rod 57 is engaged to the opposite side 52*b* of the support 52.

In FIGS. 4 to 6, when the main body 51 projects from the front door 2, the one end 57*a* of the guide rod 57 is positioned at a start point A1 of the heart shaped cam groove 56*a*. When the main body 51 moves backward against the helical compression spring 55, the one end 57*a* of the guide rod 57 moves in an orbit with respect to the outward stroke of the heart shaped cam groove 56*a*. Then, the one end 57*a* of the guide rod 57 is locked to the V shaped groove v1 that is formed on the top of the heart shaped cam groove 56*a*, whereby the main body 51 of the operation portion 5 is maintained in a backwardly moved position.

In FIGS. 4 to 6, the guide rod 57 is a round bar. The one end 57*a* of the guide rod 57 can be moved along the heart shaped cam groove 56*a*. The other end 57*b* of the guide rod 57 is rotatably engaged to the opposite side 52*b* of the support 52. A leaf spring 58 that makes the one end 57*b* of the guide rod 57 come into contact with the bottom face of the cam groove 56*a* is provided to the opposite side 52*b* of the support 52.

The operation of the gaming machine by the present invention is described next. In FIG. 1, the display portion 3 is formed to be substantially flat and not to project significantly, whereby the possibility of the front door 2 to come into contact with the gaming machine disposed adjacent is low when the front door 2 is opened at a substantially right angle. Similarly, the decorative panel part 4 is formed to be substantially flat and not to project significantly, whereby the possibility of the front door 2 to come into contact with the gaming machine disposed adjacent is low when the front door 2 is opened at a substantially right angle. The medal receiving tray 61 disposed below the decorative panel 4 and the ash tray 62, which is disposed adjacent to the medal receiving tray 61, considerably project from the decorative panel 4 and are secured to the housing 1, without being secured to the front door 2 that opens and closes (see FIGS. 2 and 3).

With a conventional operation portion secured to the display portion 3 or the decorative panel part 4 in the form of a projection, there is a high possibility of the front door 2 to come into contact with the gaming machine disposed adjacent, when the front door 2 is opened at a substantially right angle. The gaming machine 10 according to the present invention is provided with the housing 1 having an opening on the front door and the front door 2 pivotally coupled to the one side of the housing 1 so as to open and close the opening of the housing 1 (see FIG. 1).

The gaming machine 10 according to the present invention is provided with the pair of slide members 53, which permits the operation portion 5 to move backward against the front door 2. Furthermore, the gaming machine 10 is provided with the lock mechanism 5L that can hold the main body 51 in the backwardly moved position and the forwardly restored position. While the front door 2 is opened, the projecting operation portion 5 is moved backward such that the front part of the front face door 2 is formed to be substantially flush. The gaming machine according to the present invention has the front door that can be opened at a sufficient angle, which allows for more efficient inspection and maintenance of the inside of the housing.

The operation of the lock mechanism according to the present invention is described next. In FIGS. 4 to 6, the guide member 56 serves as a cam having a heart shaped cam groove 56*a* and the guide rod 57 serves as a cam follower, whereby the guide member 56 and the guide rod 57 form a cam device in which the cam and the follower perform relative movement.

In FIGS. 4 to 6, a contact point of the guide member 56 and the one end 57*a* of the guide rod 57 may not be only the plane curve that draws a heart shaped trajectory, but also the space curve including a continuous trajectory that makes the bottom face of the heart shaped cam groove 56*a* form a step or a slope, and the guide member and the guide rod form a so-called solid cam device. The contact point of the heart shaped cam groove 56*a* and the guide rod 57, drawing a heart shaped planar trajectory, draw a partially irreversible trajectory in an elevational direction.

As shown in FIG. 5, in a normal condition in which the main body 51 of the operation portion 5 projects from the front door 2, the one end 57*a* of the guide rod 57 is positioned at a start point A1 of the heart shaped cam groove 56*a*. When the main body 51 is pushed backward, the one end 57*a* of the guide rod 57 moves along a straight groove for an outward stroke of the heart shaped cam groove 56*a*. In the outward stroke of the heart shaped cam groove 56*a*, the one end 57*a* of the guide rod 57 comes into contact with a termination point and comes to rest.

Next, the main body 51 rebounds slightly, and the one end 57*a* of the guide rod 57 is locked at the V shaped groove v1 formed at the top of the heart shaped cam groove 56*a*. In the state shown in FIG. 6, although the helical compression spring 55 applies force to bias the operation portion 5 to move forward, the one end 57*a* of the guide rod 57 is counterbiased while being locked at the V shaped groove v1, whereby the operation portion 5 can be maintained in the backwardly moved position. Thus, the gaming machine according to the present invention, which is provided with the guide member and the guide rod, allows the operation portion to be maintained in the backwardly moved position with easy operation.

As shown in FIG. 6, the one end 57*a* of the guide rod 57 opens its angle outwardly and is released from the V-shaped groove v1 when the operation portion 5 is slightly pushed further from the backwardly moved position at which the one end 57*a* of the guide rod 57 is locked to the V-shaped groove v1 of the heart shaped cam groove 56*a*. The one end 57*a* of the guide rod 57 moves in accordance with the return stroke of the heart shaped cam groove 56*a*. On the return stroke, the one end 57*a* of the guide rod 57 intersects the straight groove of the outward stroke and can move back to the start point A1 of the heart shaped cam groove 56*a*. Thereafter, the forwardly restored position of the operation portion 5 can be maintained. Thus, the gaming machine according to the present invention allows the operation portion to be moved back with easy operation.

Furthermore, the gaming machine according to the present invention is provided with a pair of stop members 11*a* which comes into contact with the other end of the pair of rod members 54 inside the housing 1 (see FIG. 2). Thus, when the front door 2 is closed, the operation portion 5 is blocked from moving backward (see FIG. 1). The gaming machine according to the present invention allows the operation portion 5 to be moved backward only when the front door is opened.

What is claimed is:

1. A gaming machine, comprising:

a housing with an opening in front thereof; and a front door pivotally coupled to one side of the housing so as to open and close the opening, wherein the front door includes:

a display portion that is substantially flat and disposed in an upper portion of the housing;

a decorative panel that is flat and disposed in a lower portion of the housing; and an operation portion disposed in a middle portion of the housing, a front portion of the operation portion projecting with respect to the display portion and the decorative panel, and a rear portion of the operation portion being internally installed in the front door, wherein the operation portion includes:

a support member with a concave cross section of that encloses a rear portion of the operation portion, both distal portions of the support member being fixed to the front door;

a pair of slide members that slidably couple both distal portions of the support member to both walls of the operation portion so as to allow the operation portion to move in forward and backward directions with respect to the front door;

a rod member, a first distal portion of the rod member being fixed to a rear wall of the operation portion, and a second distal portion of the rod member projecting from a surface of the support member that is spaced a predetermined distance from the rear wall;

a biasing member to allow the operation portion to move in a forward direction, the biasing member being attached to the rod member and a lock mechanism to allow the operation portion to be maintained selectively in a backwardly moved position and a forwardly restored position, wherein the operation portion is configured to move backward such that a front surface of the front door is maintained flush while the front door is opened.

2. The gaming machine according to claim 1, wherein the housing has a stop member to which the second distal portion of the rod member abuts, and wherein the stop member restricts the operation portion from moving backward while the front door is closed.

3. The gaming machine according to claim 1, wherein the lock mechanism includes a guide member that is disposed on an upper wall of the operation portion and has a heart cam groove, and a guide rod, a first distal pardon of the guide rod being coupled to the heart cam groove and a second distal portion thereof being engaged with the support member, wherein when the operation portion is positioned to project from the front door, the first distal portion of the guide red is configured to lie at an initial position of the heart cam groove, wherein when the operation portion is moved backward against the biasing member, the first distal portion of the guide rod moves in an orbit for an outward stroke of the heart cam groove and engages with a V-shaped groove formed at a top of the heart cam groove so as to allow the operation portion to be maintained in the backwardly moved positron.

4. The gaming machine according to claim 3, wherein the housing has a stop member to which the second distal portion of the rod member abuts, and wherein the step member restricts the operation portion from moving backward while the front door is closed.

5. The gaming machine according to claim 1, wherein the lock mechanism includes a guide member that is disposed on an upper wall of the operation portion and has a heart cam groove, and a guide rod, a first distal portion of the guide rod being coupled to the heart cam groove and second distal portion thereof being engaged with the support member, wherein the first distal portion of the guide rod engages with a V-shaped groove formed at a top of the heart cam groove so as to allow the operation portion to be maintained in the backwardly moved position, and wherein when the operation portion is further depressed backward with respect to the backwardly moved position, the first distal portion of the guide rod is released from the V-shaped groove to move into an orbit for a return stroke of the heart cam groove, returning to an initial position of the heart cam groove due to force applied to the operation portion by the biasing member so as to allow the operation portion to be maintained in the forwardly restored position.

6. The gaming machine according to claim 5, wherein the housing has a stop member to which the second distal portion of the rod member abuts, and wherein the stop member restricts the operation portion from moving backward while the front door is closed.

* * * * *